3,053,735
ENOL ETHERS OF 6-CHLORO SUBSTITUTED Δ⁴-3-KETONES OF THE ANDROSTANE SERIES

Alberto Ercoli, Via Circo 12, Milan, Italy
No Drawing. Filed May 4, 1960, Ser. No. 26,713
Claims priority, application Italy Mar. 9, 1960
4 Claims. (Cl. 167—55)

This invention relates to new steroid derivatives of the androstane series, and is more particularly concerned with enol ethers of 2- or 6-substituted-Δ⁴-3-keto-androstenes.

It is an object of the invention to provide new steroid compounds having physiological activity. Another object of the invention is to provide pharmaceutical compositions containing at least one of the new compounds and it is a further object of the invention to provide a method of conducting steroid therapy employing the compositions.

The new compounds of the present invention may be represented by the following general formula:

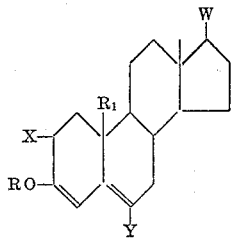

wherein R represents an aliphatic, cycloaliphatic aryl or aralkyl hydrocarbon radical, $R_1$ is methyl or hydrogen, W represents ketonic oxygen, a secondary hydroxy group or a group of the structure

in which $R_2$ indicates a lower alkyl or alkynyl radical containing from 1 to 3 carbon atoms inclusive such as, for example, methyl, ethyl, propyl, isopropyl, ethynyl, propynyl, etc. The terms X and Y represent hydrogen, either of the halogen atoms, chlorine or fluorine, or methyl with the limitation that when X is hydrogen, Y represents halogen or methyl and that when Y is hydrogen, X is halogen or methyl.

Within the scope of my invention, there are also included derivatives corresponding to Formula I above wherein the hydroxy group present in the 17β position is esterified with any organic carboxylic acid, particularly with a lower alkanoic acid.

Representative compounds corresponding to the Formula I above are alkyl, cycloalkyl and aralkyl enol ether derivatives of the following 2- or 6-substituted-Δ⁴-3-keto androstenes: 6-fluoro androstene-3,17-dione, 6-chloro androstene-3,17-dione, 6-methylandrostene-3,17-dione, 2α-methyl-androstene-3,17-dione, 2-chloro androstene-3,17-dione, 6-fluoro testosterone, 6-chloro testosterone, 6-methyltestosterone, 2α-methyltestosterone, 2-chloro testosterone, 6-fluoro-17α-methyltestosterone, 2-chloro-17α-methyltestosterone, 2α17α-dimethyltestosterone and the corresponding 19-nor derivatives thereof.

The new enol ethers of this invention possess useful biological properties and are more active than the corresponding free ketones, especially when they are given by oral route. Particularly, the enolethers of 6-halo-17α-methyltestosterone are useful as myogenic agents. For instance, the ethyl enol ether of 6-chloro-17α-methyltestosterone possesses orally 1.1 times the myogenic activity and only 0.55 times the androgenic activity of 17-methyltestosterone, and the cyclopentyl enol ether of 6-chloro-17α-methyltestosterone has six times the anabolic activity and one-third the androgenic activity of methyltestosterone, itself.

The new enol ethers of this invention are also useful as valuable intermediates for the prepartion of the corresponding normal ethers of 2- or 6-substituted 3-hydroxy androstanes which can be obtained by hydrogenating catalytically the Δ³,⁵ double bonds.

The new enol ether derivatives corresponding to Formula I above can be readily prepared by enol etherification of the corresponding 2- or 6-substituted Δ⁴-3-ketones. The details of this preparation are given below. The corresponding 2- or 6-substituted Δ⁴-3-ketones of the androstane and 19-nor androstane series are conveniently employed as starting materials in the form of their α-isomers, and these compounds are, in general, well known in the prior art. In the rare case in which they are not, they can be readily prepared according to methods described in prior scientific and patent literature. For instance, the 6-chlorinated Δ⁴-3-ketones of the androstane and 19-nor androstane series, such as 6-chloro androstenedione, 6-chloro-testosterone and 6-chloro methyltestosteron and the corresponding 19-nor derivatives, can be readily obtained by chlorination of the corresponding Δ⁴-3-ketones with N-chloro-succinimide where the keto group has been previously converted to the 3-enol ether to increase the reactivity of the molecule during the halogenation step.

The product resulting from this reaction is a mixture of 6α- and 6β-chloro epimers of the Δ⁴-3-keto steroid, cleavage of the enol ether group occuring during the reaction with the restoration of the keto group. By submitting the mixture to the action of dry gaseous hydrochloric acid, in solution in chloroform or acetic acid, isomerization to the 6α-chloro compound occurs.

The 6-fluorinated Δ⁴-3-ketones, employed as starting materials can be prepared according to Bowers and Ringold (Tetrahedron 3, 14; 1958); or also according to Hogg and Spero (Chemistry and Industry 1958, page 1002). The 2α-methyl-Δ⁴-3-ketones can be obtained according to Ringold (J. Am. Chem. Soc. 81:427, 1959).

The lower alkyl enol ethers of the present invention can be readily obtained by the action of a lower alkyl orthoformate on the corresponding free Δ⁴-3-ketones. The reaction can be carried out in the presence of small amounts of an acid catalyst both at room temperature and by heating the reaction mixture containing the alkyl orthoformate, alone or in admixture with a small proportion of the alcohol corresponding to the alkyl radical which it is desired to introduce. By following this procedure, it is possible to obtain, with good yields and in a chemically pure state, the lower alkyl enol ethers, such as methyl, ethyl, propyl, butyl, normal and iso, of 2- or 6-substituted Δ⁴-3-ketoandrostenes.

The preparation of the higher alkyl enol ethers of the invention as well as of the cycloaliphatic and aralkyl enol ethers can be brought about by using the exchange method disclosed in applicant's copending application, Serial No. 26,711, now patent No. 3,019,241, filed of even date herewith and entitled "Process for the Preparation of Enol Ethers of Δ⁴-3-Ketosteroids". This method comprises treating the methyl or ethyl enol ethers, previously formed, with the desired aliphatic, cycloaliphatic or arylaliphatic alcohol in solution in an organic solvent and in the presence of an acid catalyst. Suitable catalysts are the aromatic sulfonic acids, such as toluene, benzene and naphthalene sulfonic acids, or a Lewis acid. The medium for the exchange reaction can be a non-polar solvent such as benzene, toluene, cyclohexane, dioxane or tetrahydrofuran.

The enol ethers of 2- or 6-substituted Δ⁴-3-ketoandrostenes and 19-nor androstenes can also be obtained by an alternate procedure. For example, the enol ethers of 6-halo-testosterone and 6-halo-17α-methyltestosterone can be prepared from the corresponding enol ethers of 6-halo-androstenedione. By treating an enol ether of 6-chloro androstenedione with a reducing agent, such as lithium borohydride in solution in tetrahydrofuran, the 17-keto group is reduced to a 17β-hydroxy group and the corresponding enol ether of 6-chloro testosterone is thus obtained. Likewise, by treating an enol ether of 6-chloro androstenedione with methyl magnesium bromide, under the usual conditions for a Grignard reaction, the corresponding enol ether of 6-chloro-17α-methyltestosterone is prepared. Similarly, the corresponding 19-nor compounds may be prepared.

The enol ethers of the invention may be associated with any nontoxic solid or liquid carrier which is not incompatible with the active material. Preferably, they will be presented in solution or suspension in a substantially non-aqueous pharmaceutically acceptable liquid vehicle, such as sesame oil, olive oil, other vegetable oils, ethanol, glycols, and the like.

In the compositions of this invention, the 3-enol ethers are present in an amount sufficient to produce therapeutic effects. In general, the amount is from about 0.1 mg. to about 30 mg., preferably from about 0.5 mg. to about 20 mg. per dosage unit.

The method of this invention comprises orally administering the 3-enol ethers to humans, in an amount sufficient to produce therapeutic effects, in admixture with a nontoxic pharmaceutical carrier as exemplified above. The daily dosage of 3-enol ethers will be in an amount of from about 0.1 mg. to about 50 mg. and preferably from about 0.5 mg. to about 25 mg. The administration is by the oral route, in equal doses, one to three times daily.

The preparation of the new steroid derivatives is illustrated in detail by the following examples:

*Example 1.—3-Ethyl Enol Ether of 6-Chloro-Androsten-3,17-Dione*

The starting 6-chloro androstenedione is prepared as follows: 365 mg. of ethyl enol ether of androstenedione are suspended in a mixture of 10 cc. acetone, 2 cc. water and 200 mg. sodium acetate. The suspension is cooled at 0° C. and 200 mg. of N-chloro-succinimide and 0.2 cc. of glacial acetic acid are added slowly. The reaction mixture is stirred for one hour, 30 cc. of water are then added and the precipitate which forms is filtered off. The residue is crystallized, after drying, from a mixture acetone/hexane and 6-chloro androstenedione (mixture of α and β epimers) is obtained; M. Pt. 180–200° C.

Although it is not essential, it being possible to react the mixture of α and β epimers, the mixture is converted entirely into the 6α-chloro epimer. To this end, 1 g. of the mixture of 6-chloro androstenedione, as obtained above, in solution in 50 cc. glacial acetic acid, is treated with a dry gaseous hydrochloric acid stream for about two hours. The treatment completed, the solution is poured into water, thus obtaining a precipitate which is filtered, dried, and crystallized from ethyl alcohol. Thus 6α-chloro-androstenediene is obtained (M. Pt. 212–213° C., dec.).

0.641 g. of 6α-chloro androstenedione, as obtained above, are treated with 0.296 g. of ethyl orthoformate, 3 cc. of absolute ethyl alcohol and 5 cc. of anhydrous tetrahydrofuran, 10 mg. of p-toluenesulfonic acid are added and the suspension is stirred until complete solution is obtained. The mixture is allowed to stand for approximately 30 minutes and then a few drops of pyridine are added, the solvent is evaporated in vacuo and the residue crystallized from ethyl alcohol.

Yield 0.445 g. of enol ethyl ether of 6-chloro androstenedione, M. Pt. 148–149° C. (dec.); [α]$_D$=—93°±1 (dioxan). The same product is obtained starting from the mixture of 6α- and 6β-chloro epimers.

*Example 2.—3-Methyl Enol Ether of 6-Chloro Androsten-3,17-Dione*

100 mg. of ethyl enol ether of 6-chloro androstenedione are treated with 5.5 cc. of methyl alcohol and a few drops of dilute (10%) sulfuric acid. The solution is brought to boiling for about 10 minutes, then cooled and almost all of the methanol is evaporated. A product is obtained which crystallized from a small volume of methanol, melts at 184–185° C. (dec.); [α]$_D$=—84°±1. Yield 65 mg.

*Example 3.—3-n-Heptyl Enol Ether of 6-Chloro Androsten-3,17-Dione*

0.5 g. of ethyl enol ether of 6-chloro androstenedione, dissolved in 300 cc. of benzene, are treated with 1.4 cc. of n-heptyl alcohol and 15 mg. of p-toluenesulfonic acid. The mixture is brought to boiling and distilled for about half an hour in order to concentrate the solution to ⅓ of the starting volume. A few drops of pyridine are added and the mixture is concentrated in vacuo. The residue is taken up with aqueous methyl alcohol and the product, precipitated by cooling, filtered and crystallized from methyl alcohol. Thus, 0.35 g. of n-heptyl enol ether of 6-chloro androstenedione are obtained melting at 99–100° C.; [α]$_D$=—77.5°±1 (dioxan).

*Example 4.—3-Cyclopentyl Enol Ether of 6-Chloro Androsten-3,17-Dione*

500 mg. of 6-chloro androstenedione ethyl enol ether are added to a boiling solution of 300 cc. of benzene containing 1.4 cc. of cyclopentanol and 15 mg. of p-toluenesulfonic acid. The solution is distilled for about thirty minutes to remove ethyl alcohol, then cooled. To the remaining solution, a few drops of pyridine are added and the benzene is removed by evaporation under reduced pressure. The residue taken up with methyl alcohol gives 340 mg. of cyclopentyl enol ether of 6-chloro androstenedione, melting at 179–180° C.; [α]$_D$=—100°±1 (dioxan).

*Example 5.—3-Ethyl Enol Ether of 6-Fluoro Androsten-3,17-Dione*

A mixture containing 300 mg. of 6α-fluoro androstenedione, 0.3 cc. of ethyl orthoformate, 2.4 cc. of dry ethanol, 1.5 cc. of tetrahydrofuran, and 15 mg. of p-toluenesulfonic acid is stirred at about 20° C. until the solution becomes clear (about fifteen minutes). The solution is allowed to stand for approximately 30 minutes, then a few drops of pyridine are added and the solvent is evaporated in vacuo. The residue, crystallized from methyl alcohol, gives 0.210 g. of enol ethyl ether of 6-fluoro androstenedione, M. Pt. 142–43° C.; [α]$_D$=—78.5° (dioxan).

*Example 6.—3-n-Hexyl Enol Ether of 6-Fluoro Androsten-3,17-Dione*

By treating the ethyl enol ether of 6-fluoro androstenedione with n-hexyl alcohol, according to the procedure described in Example 3, the n-hexyl enol ether of 6-fluoro androstenedione is obtained, M. Pt. 98–100° C.; [α]$_D$=—66.5° (dioxan).

*Example 7.—3-Cyclopentyl Enol Ether of 6-Fluoro Androsten-3,17-Dione*

By treating the ethyl enol ether of 6-fluoro androstenedione with cyclopentanol, according to the procedure described in Example 4, the cyclopentyl enol ether of 6-fluoro androstenedione is obtained; M. Pt. 178–179° C.; [α]$_D$=—86°±1 (dioxan).

*Example 8.—3-Ethyl Enol Ether of 6-Chloro Testosterone*

A. 6-chloro testosterone is prepared as follows: 520 mg. of enol ethyl ether of testosterone are suspended in a mixture of 15 cc. of acetone, 2.8 cc. of water and 300 mg. of sodium acetate and treated at a temperature of 0° C. with 310 mg. of N-chloro-succinimide and 0.3 cc. of glacial acetic acid. The reaction mixture is stirred for an hour, then poured into ice water. A product precipitates which consists of a mixture of 6α- and 6β-chloro testosterone (M. Pt. 150–180° C.).

This product is suspended in 3 cc. of tetrahydrofuran and treated with 3 cc. of absolute ethyl alcohol, 0.250 g. of ethyl orthoformate and 10 mg. of p-toluenesulfonic acid. The reaction mixture is stirred for 1 hour at room temperature (about 25° C.), then cooled and the acidity of the solution neutralized with a few drops of pyridine. By evaporation of the solvent, 0.250 g. of ethyl enol ether of 6-chloro testosterone are obtained. After recrystallization from methyl alcohol, the product melts at 99–100° C.; $[\alpha]_D = -148° \pm 2$ (dioxan).

B. 3-ethyl enol ether of 6-chloro testosterone can be directly obtained from the corresponding 3-ethyl enol ether of androstenedione as follows:

1 g. of 6-chloro androstenedione ethyl enol ether is dissolved in 15 cc. of anhydrous tetrahydrofuran and the solution is added to a suspension of 1 g. of lithium borohydride in 30 cc. of anhydrous tetrahydrofuran, over a 30-minute period. The mixture is vigorously stirred at a temperature of about 5° C., under a nitrogen stream. The addition accomplished, the mixture is allowed to stand 4 hours at 0° C. and then 5 cc. of a 10% solution of acetic acid are added. The pH is adjusted to 7–8 by addition of pyridine and the mixture is concentrated in vacuo. The residue is crystallized from methanol. Thus 0.695 g. of enol ethyl ether of 6-chloro testosterone are obtained, melting at 98–99° C.

Example 9.—3-n-Heptyl Enol Ether of 6-Chloro Testosterone n-Heptyl enol ether of 6-chloro testosterone is obtained (M. Pt. 99–100° C.), by treating 0.500 g. of heptyl enol ether of 6-chloro androstenedione with 0.5 g. of lithium borohydride in tetrahydrofuran suspension, according to the procedure described in Example 8, Part B. The product has a melting point of 63–64° C.; $[\alpha]_D = -120° \pm 1$ (dioxan).

Example 10.—3-Ethyl Enol Ether of 6-Chloro-17α-Methyltestosterone

A. 6-chloro-17α-methyltestosterone is prepared by treating 0.800 g. of enol ethyl ether of 17α-methyltestosterone with 530 mg. of N-chloro-succinimide, under the conditions given in Example 8, Part A.

The reaction yields only the 6β-chloro compound melting at 156° C. (dec.). The 6α-chloro epimer is obtained by treating 500 mg. of the 6β-chloro compounds in chloroform solution with dry, gaseous hydrochloric acid for twenty minutes at a temperature of approximately 0° C., evaporating the solvent and recrystallizing the residue from hexane. Yield: 400 mg. of 6α-chloro-17α-methyltestosterone at M. Pt. 153–154° C. (dec.).

This product is dissolved in 3 cc. of tetrahydrofuran and treated with 0.25 cc. of ethyl orthoformate, 1.8 cc. of absolute ethanol and 10 mg. of p-toluenesulfonic acid. The mixture is allowed to stand for forty minutes at room temperature, then a few drops of pyridine are added and the solvent evaporated. The residue crystallized from methyl alcohol yields 0.33 g. of ethyl enol ether of 6-chloro-17α-methyltestosterone, M. Pt. 72–73° C.; $[\alpha]_D = -156 \pm 2$ (dioxan).

B. The same product can be obtained as follows: 720 mg. of 6-chloro androstenedione ethyl enol ether are dissolved in a few cubic centimeters of anhydrous benzene and added to an ethereal solution of methyl magnesium bromide, prepared by treating a suspension of 1 g. of magnesium in 30 cc. of anhydrous ether with 30 cc. of an ethereal solution of methyl bromide (0.13 g./cc.). The mixture is allowed to stand overnight at room temperature, then treated with an aqueous solution of ammonium chloride. The aqueous layer is separated and extracted twice with ether. The collected ethereal extracts are washed with water, dried over anhydrous sodium sulfate, and the solvent is evaporated. The residue, crystallized from methanol, yields 0.510 g. of 3-ethyl enol ether of 6-chloro-17α-methyltestosterone; M. Pt. 71–73° C. (dec.).

Example 11.—3-Cyclopentyl Enol Ether of 6-Chloro-17α-Methyl Testosterone 500 mg. of 6-chloro-17α-methyltestosterone ethyl enol ether are dissolved in 250 cc. of anhydrous benzene and treated with 1.8 cc. of cyclopentyl alcohol and 18 mg. of p-toluenesulfonic acid. The solution is brought to boiling and distilled for about thirty minutes in order to reduce the liquid to ⅔ of the starting volume. Then a few drops of pyridine are added and the solvent is evaporated in vacuo.

After recrystallization of the residue from methyl alcohol, 350 mg. of cyclopentyl enol ether of 6-chloro-17α-methyltestosterone are obtained, melting at 139–139.5° C. (dec.); $[\alpha]_D = -159° \pm 1$ (dioxan).

Example 12

By treating cyclopentyl enol ether of 6-fluoro androstenedione according to the procedure described in Example 10, Part B, there is obtained cyclopentyl enol ether of 6-fluoro-17α-methyltestosterone at M. Pt. 146–149° C.; $[\alpha]_D = -137.5° \pm 0.5$ (dioxan).

Example 13

Cyclopentyl enol ether of 6-fluoro-testosterone (M. Pt. 134–136° C.; $[\alpha]_D = -119$, dioxan) is obtained according to the procedure described in Example 8, Part B, by treating the corresponding cyclopentyl enol ether of 6-fluoro androstenedione with lithium borohydride in tetrahydrofuran suspension.

Example 14.—n-Amyl Enol Ether of 2α-Methyltestosterone Acetate 2 g. of 2α-methyltestosterone acetate are treated with 2 cc. of ethyl orthoformate, 4 cc. of absolute ethanol and 20 mg. of p-toluene sulfonic acid. The reaction mixture is continuously stirred at room temperature, under completely anhydrous conditions, until there is obtained a limpid solution. After standing at room temperature for about 30 minutes, the solution is poured into boiling mixture of 300 cc. of benzene and 7 cc. of n-amyl alcohol containing 40 mg. of p-toluenesulfonic acid. A part of the solvent is distilled off and to the remaining solution a few drops of pyridine are added and the liquid is completely eliminated under reduced pressure. The residue is taken up with methanol to give 1.950 g. of n-amyl enol ether of 2α-methyltestosterone acetate, melting point 145–147° C.; $[\alpha]_D = -96°$ (dioxan).

This product, suspended in 50 cc. of methanol is heated to reflux for 30 minutes under an inert gas atmosphere with 600 mg. of potassium hydroxide dissolved in 10 ml. of methanol. The reaction mixture is then concentrated under reduced pressure and to the remaining solution, a small amount of water is added. There is obtained a crystalline precipitate consisting of 1.450 g. of n-amyl enol ether of 2α-methyltestosterone, melting point 108–110° C.; $[\alpha]_D = -97.5°$ (dioxan).

Example 15

In the same manner as in Example 14, the following new compounds are prepared:

n-Amyl enol ether of 2α-methyltestosterone acetate
Hexyl enol ether of 2α-methyltestosterone
Cyclohexyl enol ether of 2α-methyltestosterone
Cyclopentyl enol ether of 2α-methyltestosterone
Cyclopentyl enol ether of 2α-methyltestosterone acetate
Cyclopentyl enol ether of 2α-methyltestosterone propionate.

Example 16

According to the procedure described in the previous example, but using as starting material 2α,17α-dimethyltestosterone, the following enol ethers are obtained:

Methyl enol ether of 2α,17α-dimethyltestosterone
Ethyl enol ether of 2α,17α-dimethyltestosterone
n-Amyl enol ether of 2α,17α-dimethyltestosterone
n-Hexyl enol ether of 2α,17α-dimethyltestosterone
Cyclohexyl enol ether of 2α,17α-dimethyltestosterone
Cyclopentyl enol ether of 2α,17α-dimethyltestosterone and the corresponding acetate and propionate thereof.

Example 17

According to the procedure described in Example 14, but using as starting material 6α-methyltestosterone instead of 2α-methyltestosterone, the following new enol ethers are prepared:

Ethyl enol ether of 6-methyltestosterone
Amyl enol ether of 6-methyltestosterone
Hexyl enol ether of 6-methyltestosterone
Cyclohexyl enol ether of 6-methyltestosterone
Cyclopentyl enol ether of 6-methyltestosterone.

Example 18

Following analogous procedures, there are prepared the 19-nor compounds corresponding to the compounds produced in Examples 1–17, inclusive.

I claim:

1. Cyclopentyl 3-enol ether of 6-chloro-17α-methyltestosterone.

2. A compound having the formula

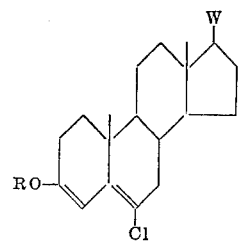

in which R is a member selected from the group consisting of lower alkyl and cyclopentyl and W is a member selected from the group consisting of ketonic oxygen, β-hydroxy and a β-hydroxy, α-methyl grouping.

3. An oral composition in dosage unit form comprising from 0.1 mg. to 30 mg. of at least one of the compounds of claim 2 and a non-toxic pharmaceutical carrier therefor.

4. A method of conducting steroid therapy comprising administering daily to a human patient from 0.1 mg. to 50 mg. of at least one of the compounds of claim 2.

References Cited in the file of this patent

UNITED STATES PATENTS

| | | |
|---|---|---|
| 2,363,338 | Koster | Nov. 21, 1944 |
| 2,867,630 | Pederson et al. | Jan. 6, 1959 |
| 2,929,763 | Wettstein et al. | Mar. 22, 1960 |

OTHER REFERENCES

Dorfman et al.: Androgens (1956), John Wiley and Sons, Inc., New York, pages 383–4.

Campbell et al.: J.A.C.S. 80, 4717-21 (1958).